US009714769B2

(12) United States Patent
Choi et al.

(10) Patent No.: US 9,714,769 B2
(45) Date of Patent: Jul. 25, 2017

(54) AIR CONDITIONER

(71) Applicant: LG ELECTRONICS INC., Seoul (KR)

(72) Inventors: Song Choi, Seoul (KR); Baikyoung Chung, Seoul (KR); Hojong Jeong, Seoul (KR); Wooho Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 14/435,769

(22) PCT Filed: Oct. 21, 2013

(86) PCT No.: PCT/KR2013/009378
§ 371 (c)(1),
(2) Date: Apr. 15, 2015

(87) PCT Pub. No.: WO2014/065548
PCT Pub. Date: May 1, 2014

(65) Prior Publication Data
US 2015/0267928 A1  Sep. 24, 2015

(30) Foreign Application Priority Data
Oct. 24, 2012  (KR) .......................... 10-2012-0118353

(51) Int. Cl.
*F25B 1/00* (2006.01)
*F24F 5/00* (2006.01)
(Continued)

(52) U.S. Cl.
CPC .............. *F24F 5/001* (2013.01); *F25B 13/00* (2013.01); *F25B 27/02* (2013.01);
(Continued)

(58) Field of Classification Search
CPC .................................... F25B 1/10; F25B 13/00
(Continued)

(56) References Cited

U.S. PATENT DOCUMENTS

2006/0026981 A1    2/2006  Inaba et al.
2007/0295018 A1*  12/2007  Williams ................ F24D 17/02
                                                                  62/238.6
2008/0023961 A1*   1/2008  Cho ........................ F25B 27/02
                                                                    290/2

FOREIGN PATENT DOCUMENTS

CN    1438133 A    8/2003
CN    1737467 A    2/2006
(Continued)

OTHER PUBLICATIONS

European Search Report dated May 31, 2016.
International Search Report dated Jan. 22, 2014 issued in Application No. PCT/KR2013/009378.

*Primary Examiner* — Melvin Jones
(74) *Attorney, Agent, or Firm* — KED & Associates, LLP

(57) ABSTRACT

An air conditioner is disclosed. The air conditioner includes an indoor unit, a first outdoor unit including a first outdoor heat exchanger and a first compressor to be driven by electricity, a second outdoor unit including a second outdoor heat exchanger and a second compressor to be driven by an engine, a cooling water line, through which cooling water to cool the engine flows, and at least one waste heat-recovering heat exchanger for exchanging heat between refrigerant to be introduced into at least one of the first outdoor heat exchanger and the second outdoor heat exchanger and the cooling water flowing through the cooling water line. By provision of the waste heat-recovering heat exchanger, which heat-exchanges hot cooling water with refrigerant flowing through the first and second outdoor heat exchangers, frost formed on the first and second outdoor units during low-temperature heating is removed. It is possible to cope (Continued)

with a wide range of heating loads while achieving high efficiency, using both the electric heat pump (EHP) system and the gas engine-driven heat pump (GHP) system.

15 Claims, 7 Drawing Sheets

(51) Int. Cl.
*F25B 27/02* (2006.01)
*F25B 13/00* (2006.01)

(52) U.S. Cl.
CPC . *F25B 2313/02742* (2013.01); *F25B 2400/05* (2013.01); *F25B 2400/075* (2013.01)

(58) Field of Classification Search
USPC .......... 62/115, 173, 176.3, 238.6, 324.1, 498
See application file for complete search history.

(56) References Cited

FOREIGN PATENT DOCUMENTS

| | | |
|---|---|---|
| CN | 1840991 A | 10/2006 |
| CN | 102431413 A | 5/2012 |
| EP | 1 744 109 | 1/2007 |
| EP | 1 884 648 | 2/2008 |
| JP | 2000-111198 A | 4/2000 |
| JP | 2002-168539 | 6/2002 |
| JP | 2006-046763 A | 2/2006 |
| KR | 20-0388010 Y1 | 6/2005 |
| KR | 10-2006-0005075 A | 1/2006 |
| KR | 10-2006-0016391 A | 2/2006 |

* cited by examiner

AIR CONDITIONER

CROSS-REFERENCE TO RELATED PATENT APPLICATIONS

This application is a U.S. National Stage Application under 35 U.S.C. §371 of PCT Application No. PCT/KR2013/009378, filed Oct. 21, 2013, which claims priority to Korean Patent Application No. 10-2012-0118353, filed Oct. 24, 2012, whose entire disclosures are hereby incorporated by reference.

TECHNICAL FIELD

The present invention relates to an air conditioner, and more particularly, to a hybrid air conditioner, which is driven through an electric heat pump (EHP) system and a gas engine-driven heat pump (GHP) system, thereby being capable of achieving an enhancement in heating efficiency and defrost performance.

BACKGROUND ART

An air conditioner is an apparatus for cooling/heating an indoor space or purifying air in order to provide a more pleasant indoor environment.

Such air conditioners are classified into a separation type air conditioner, in which an indoor unit and an outdoor unit are separate from each other, and an integrated air conditioner, in which an indoor unit and an outdoor unit are integrated. Air conditioners may also be classified, in accordance with capacities thereof, into a single type air conditioner, which has a capacity to drive one indoor unit, for use in a small space, a large-size air conditioner, which has a great capacity, for use in companies or restaurants, and a multi-air conditioner, which has a capacity to sufficiently drive a plurality of indoor units.

The separation type air conditioner includes an indoor unit installed in an indoor space, to supply hot air or cold air to the indoor space, and an outdoor unit for executing compression, expansion, etc. of refrigerant in order to enable the indoor unit to perform effective heat exchange operation.

Meanwhile, air conditioners may also be classified, in accordance with power sources for driving a compressor, into an EHP type air conditioner and a GHP type air conditioner. The EHP system uses electricity as a power source for a compressor, whereas the GHP system uses fuel such as liquefied natural gas (LNG) or liquefied petroleum gas (LPG). In the GHP system, an engine operates through combustion of fuel, to provide power for a compressor motor.

The EHP system has advantages in that it is possible to appropriately cope with partial load while achieving high energy efficiency because easy compressor control is possible through adjustment of supply current. However, the EHP system has a problem in that frost may be formed on an outdoor heat exchanger during low-temperature heating.

On the other hand, the GHP type air conditioner has an advantage of excellent defrost performance through utilization of waste engine heat. However, there is a problem of low engine efficiency due to heat loss, etc.

DISCLOSURE OF INVENTION

Technical Problem

The present invention has been made in view of the above-mentioned problems, and an object of the present invention is to provide an air conditioner, which includes an electric heat pump (EHP) type outdoor unit and a gas engine-driven heat pump (GHP) type outdoor unit, thereby being capable of achieving an enhancement in heating efficiency while achieving an enhancement in defrost performance during low-temperature heating.

Solution to Problem

The object of the present invention can be achieved by providing an air conditioner including an indoor unit comprising an indoor heat exchanger, a first outdoor unit connected to the indoor heat exchanger via a refrigerant line, the first outdoor unit comprising a first outdoor heat exchanger and a first compressor to be driven by electricity, a second outdoor unit connected to the indoor heat exchanger via another refrigerant line, the second outdoor unit comprising a second outdoor heat exchanger and a second compressor to be driven by an engine, a cooling water line, through which cooling water to cool the engine flows, and at least one waste heat-recovering heat exchanger for exchanging heat between refrigerant to be introduced into at least one of the first outdoor heat exchanger and the second outdoor heat exchanger and the cooling water flowing through the cooling water line.

The waste heat-recovering heat exchanger may heat-exchange the refrigerant to be introduced into the first outdoor heat exchanger and the cooling water.

The waste heat-recovering heat exchanger may heat-exchange the refrigerant to be introduced into the second outdoor heat exchanger and the cooling water.

The waste heat-recovering heat exchanger may include a first waste heat-recovering heat exchanger for exchanging heat with the refrigerant to be introduced into the first outdoor heat exchanger, and a second waste heat-recovering heat exchanger for exchanging heat with the refrigerant to be introduced into the second outdoor heat exchanger.

The cooling water may sequentially pass through the first waste heat-recovering heat exchanger and the second waste heat-recovering heat exchanger after being heated while cooling the engine, to exchange heat with the refrigerant.

The first waste heat-recovering heat exchanger and the second waste heat-recovering heat exchanger may be arranged in parallel in a flow direction of the cooling water. The cooling water line may be branched into a first branched line connected to the first waste heat-recovering heat exchanger and a second branched line connected to the second waste heat-recovering outdoor heat exchanger.

The air conditioner may further include a first control valve provided at the first branched line, to adjust an amount of the cooling water performing heat exchange in the first waste heat-recovering heat exchanger, and a second control valve provided at the second branched line, to adjust an amount of the cooling water performing heat exchange in the second waste heat-recovering heat exchanger.

Opening degrees of the first and second control valves may be adjusted to differ from each other such that a greater amount of cooling water is introduced into one of the first and second waste heat-recovering heat exchangers, which exhibits a lower refrigerant temperature.

The waste heat-recovering heat exchanger may be connected with the refrigerant line, through which the refrigerant to be introduced into the first outdoor heat exchanger flows, the refrigerant line, through which the refrigerant to be introduced into the second outdoor heat exchanger flows, and the cooling water line.

The waste heat-recovering heat exchanger may include a first passage, through which the refrigerant to be introduced into the first outdoor heat exchanger flows, a second passage, through which the refrigerant to be introduced into the second outdoor heat exchanger flows, and a cooling water passage, through which cooling water flows. The cooling water passage may be arranged between the first passage and the second passage.

Both the first outdoor unit and the second outdoor unit may operate when heating load is equal to or greater than predetermined load. Only the first outdoor unit may operate when heating load is smaller than the predetermined load.

When heating load is smaller than the predetermined load, and an electricity price per energy unit is higher than a fuel price per energy unit by a predetermined value or more, operation of the first outdoor unit may be stopped, and the second outdoor unit may operate.

In another aspect of the present invention, provided herein is an air conditioner including a plurality of indoor units, at least one electric heat pump (EHP) type outdoor unit comprising a first outdoor heat exchanger and a first compressor to be driven by electricity, and at least one a gas engine-driven heat pump (GHP) type outdoor unit comprising a second outdoor heat exchanger, a second compressor to be driven by an engine, and a cooling water line to cool the second compressor, further including a heat transfer unit for transferring waste heat of cooling water flowing through the cooling water line to refrigerant to be introduced into the first outdoor heat exchanger and refrigerant to be introduced into the second outdoor heat exchanger.

The heat transfer unit may include a first waste heat-recovering heat exchanger, to which the cooling water line is connected along with a refrigerant line, through which the refrigerant to be introduced into the first outdoor heat exchanger flows, and a second waste heat-recovering heat exchanger, to which the cooling water line is connected along with a refrigerant line, through which the refrigerant to be introduced into the second outdoor heat exchanger flows.

The first and second waste heat-recovering heat exchangers may be arranged in parallel. The cooling water line may be branched into a plurality of branched lines corresponding in number to the first and second waste heat-recovering heat exchangers such that the branched lines are connected to the first and second waste heat-recovering heat exchangers, respectively.

The heat transfer unit may include a waste heat-recovering heat exchanger, to which the cooling water line is connected along with a refrigerant line, through which the refrigerant to be introduced into the first outdoor heat exchanger flows, and another refrigerant line, through which the refrigerant to be introduced into the second outdoor heat exchanger flows.

The waste heat-recovering heat exchanger may include a first passage, through which the refrigerant to be introduced into the first outdoor heat exchanger flows, a second passage, through which the refrigerant to be introduced into the second outdoor heat exchanger flows, and a cooling water passage, through which cooling water flows. The cooling water passage may be arranged between the first passage and the second passage.

Advantageous Effects of Invention

In accordance with the present invention, the waste heat-recovering heat exchanger may heat-exchange cooling water with refrigerant introduced into the first outdoor heat exchanger, which is of an electric heat pump (EHP) type, and the second outdoor heat exchanger, which is of a gas engine-driven heat pump (GHP) type. Accordingly, it may be possible to enhance the energy efficiency of the air conditioner while achieving an enhancement in defrost performance.

In accordance with the present invention, the first waste heat-recovering heat exchanger to exchange heat with the refrigerant to be introduced into the first outdoor heat exchanger and the second waste heat-recovering heat exchanger to exchange heat with the refrigerant to be introduced into the second outdoor heat exchanger may be arranged in parallel. Accordingly, it may be possible to adjust an amount of cooling water in accordance with a temperature of refrigerant.

In accordance with the present invention, the refrigerant line, through which refrigerant to be introduced into the first outdoor heat exchanger flows, the refrigerant line, through which refrigerant to be introduced into the second outdoor heat exchanger flows, and the cooling water line may be connected to the single waste heat-recovering heat exchanger. Accordingly, it may be possible to simplify the structure of the air conditioner.

In accordance with the present invention, both the first outdoor unit and the second outdoor unit may operate when heating load is equal to or greater than predetermined load. Only the first outdoor unit may operate when heating load is smaller than the predetermined load. When heating load is smaller than the predetermined load, and an electricity price per energy unit is higher than a fuel price per energy unit by a predetermined value or more, the second outdoor unit may operate. Accordingly, it may be possible to reduce heating cost while achieving an enhancement in heat efficiency.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
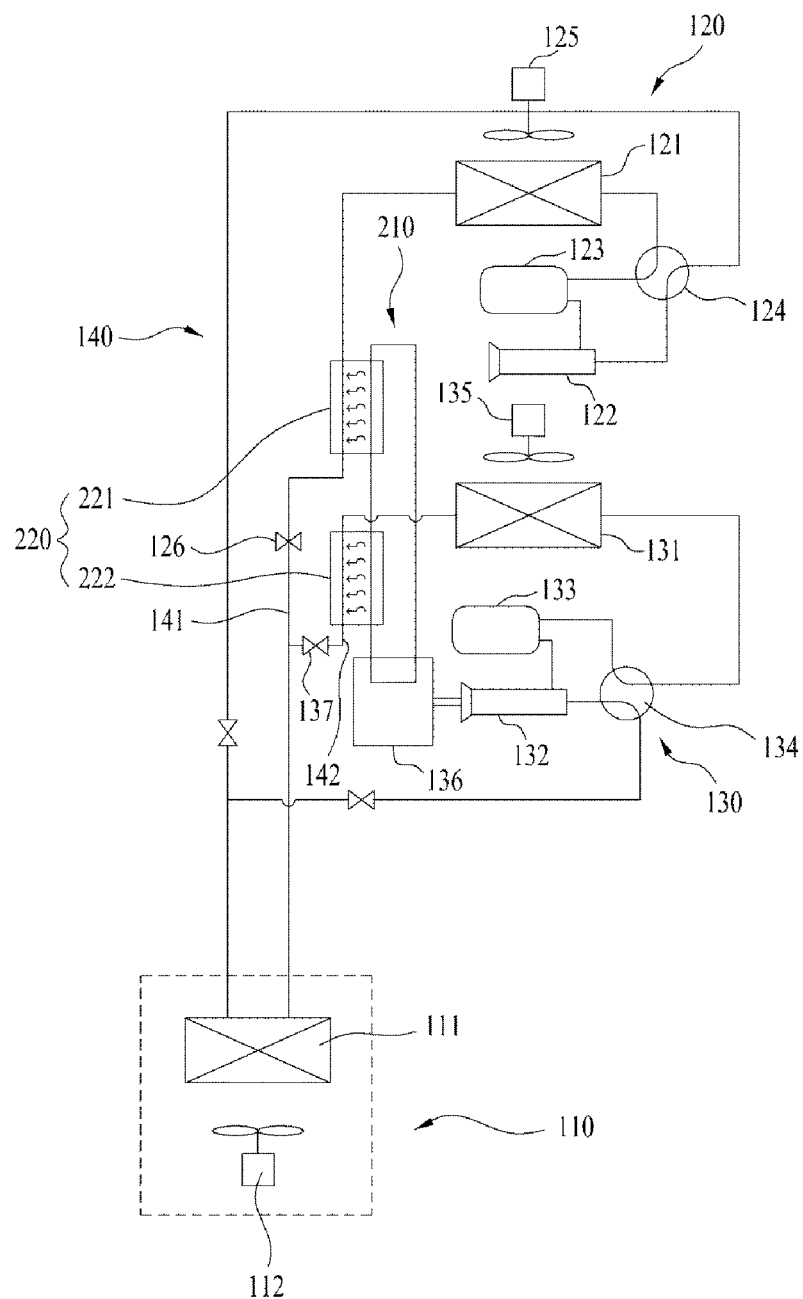
FIG. 1 is a diagram illustrating a configuration of an air conditioner according to an embodiment of the present invention, which includes a first waste heat-recovering heat exchanger and a second waste heat-recovering heat exchanger.

Reference will now be made in detail to the preferred embodiments of the present invention associated with an air conditioner, examples of which are illustrated in the accompanying drawings. The accompanying drawings illustrate exemplary embodiments of the present invention and provide a more detailed description of the present invention. However, the scope of the present invention should not be limited thereto.

In addition, wherever possible, the same reference numbers will be used throughout the drawings to refer to the same or like parts, and a repeated description thereof will be omitted. For clarity, dimensions and shapes of respective constituent members illustrated in the drawings may be exaggerated or reduced.

In the meantime, although terms including an ordinal number, such as first or second, may be used to describe a variety of constituent elements, the constituent elements are not limited to the terms, and the terms are used only for the purpose of discriminating one constituent element from other constituent elements.

The present invention includes a first outdoor unit including a first outdoor heat exchanger and a first compressor to be driven by electricity, a second outdoor unit including a second outdoor heat exchanger and a second compressor to be driven by an engine, a cooling water line for cooling the engine, and at least one waste heat-recovering heat exchanger for heat-exchanging refrigerant to be introduced into at least one of the first and second outdoor heat exchangers with cooling water flowing through the cooling water line.

The present invention is a hybrid air conditioner including a first outdoor unit, which is of an electric heat pump (EHP) type, and a second outdoor unit, which is of a gas engine-driven heat pump (GHP) type.

The first outdoor unit, which is an EHP type outdoor unit, is a heat pump in which axial power from an electric motor is transmitted to the first compressor in order to drive the first compressor. The second outdoor unit, which is a GHP type outdoor unit, is a heat pump in which mechanical axial power from a gas engine is directly transmitted to the second compressor in order to drive the second compressor.

The present invention includes a waste heat-recovering heat exchanger for heat-exchanging hot cooling water with refrigerant flowing through at least one of the first and second outdoor heat exchangers and, as such, it may be possible to remove frost formed on the first and second outdoor units during low-temperature heating. It may also be possible to cope with a wide range of heating loads while achieving high efficiency, using both the EHP system and the GHP system.

Hereinafter, an air conditioner according to an embodiment of the present invention will be described in detail with reference to the accompanying drawings.

FIG. 1 is a diagram illustrating a configuration of an air conditioner according to an embodiment of the present invention, which includes a first waste heat-recovering heat exchanger and a second waste heat-recovering heat exchanger.

The present invention may include an indoor unit 110 including an indoor heat exchanger 111. The indoor unit 110 may also include an indoor fan 112.

The indoor unit 110 is connected to a first outdoor unit 120 of an EHP type and a second outdoor unit 130 of a GHP type via refrigerant lines 140, respectively. It may be possible to cool/heat an indoor space through supply of refrigerant to the indoor unit 110 by selectively operating the first outdoor unit 120 or the second outdoor unit 130 or simultaneously operating the first outdoor unit 120 and the second outdoor unit 130.

In an embodiment, the refrigerant lines 140, through which refrigerant is introduced into or discharged from the indoor unit 110, may be connected to the first outdoor unit 120 and second outdoor unit 130, respectively, after being branched from a single line.

That is, refrigerant discharged from the indoor unit 110 may be introduced into the first outdoor unit 120 and second outdoor unit 130 after being divided into two flows. Refrigerant flows respectively discharged from the first outdoor unit 120 and second outdoor unit 130 may be introduced into the indoor unit 110 after being joined.

Meanwhile, the first outdoor unit 120 includes a first outdoor heat exchanger 121 for exchanging heat with outdoor air, and a first compressor 122 to be driven by electricity. The first outdoor unit 120 may also include an accumulator 123 for separating liquid refrigerant from the refrigerant to be introduced into the first compressor 122, a four-way valve 124 for changing a flow path of refrigerant, and an outdoor fan 125.

The second outdoor unit 130 includes a second outdoor heat exchanger 131 for exchanging heat with outdoor air, and a second compressor 132 to be driven by an engine 136. The second outdoor unit 130 may also include an accumulator 133, a four-way valve 134, and an outdoor fan 135.

In addition, the second outdoor unit 130 includes a cooling water line 210 for cooling the engine 136. The cooling water line 210 may form a closed loop. Cooling water flows through the cooling water line 210. The cooling water flowing through the cooling water line 210 may cool the engine 136 by absorbing heat from the engine 136, which has been heated.

The present invention includes a waste heat-recovering heat exchanger 220 for heat-exchanging cooling water in the cooling water line 210 with refrigerant flows respectively introduced into the first and second outdoor heat exchangers 121 and 131. The waste heat-recovering heat exchanger 220 may be provided at the cooling water line 210.

The waste heat-recovering heat exchanger 220 may include a first waste heat-recovering heat exchanger 221 for exchanging heat with refrigerant to be introduced into the first outdoor heat exchanger 121, and a second waste heat-recovering heat exchanger 222 for exchanging heat with refrigerant to be introduced into the second outdoor heat exchanger 131. The following description will be given in conjunction with the case in which both the first outdoor unit 120 and the second outdoor unit 130 are driven.

Connected to the first waste heat-recovering heat exchanger 221 are a refrigerant line 141, through which refrigerant to be introduced into the first outdoor heat exchanger 121 flows, and a cooling water line 210, through which hot cooling water flows. Connected to the second waste heat-recovering heat exchanger 222 are a refrigerant line 142, through which refrigerant to be introduced into the second outdoor heat exchanger 131 flows, and the cooling water line 210, through which hot cooling water flows.

As illustrated in FIG. 1, in accordance with the present invention, the first and second waste heat-recovering heat exchangers 221 and 222 may be arranged in line in a flow direction of cooling water. In detail, the first and second waste heat-recovering heat exchangers 221 and 222 may be connected by the single cooling water line 210. In an embodiment, cooling water heated while passing through the engine 136 sequentially passes through the second waste heat-recovering heat exchanger 222 and the first waste heat-recovering heat exchanger 221. In this case, the cooling water exchanges heat with refrigerant while passing through the second waste heat-recovering heat exchanger 222, and then exchanges heat with refrigerant while passing through the first waste heat-recovering heat exchanger 221. In this regard, the arrangement in which the cooling water line sequentially passes through the second waste heat-recovering heat exchanger 222 and the first waste heat-recovering heat exchanger 221 may be referred to as a "serial connection arrangement". That is, the first waste heat-recovering heat exchanger 221 and second waste heat-recovering heat exchanger 222 may be connected in series in a flow direction of cooling water.

Of course, the present invention is not limited to the above-described arrangement. For example, cooling water may sequentially pass through the first waste heat-recovering heat exchanger 221 and the second waste heat-recovering heat exchanger 222. The first and second waste heat-recovering heat exchangers 221 and 222 are preferably arranged such that cooling water preferentially passes through the waste heat-recovering heat exchanger 220, which exhibits a lower refrigerant temperature.

In this case, heat exchange occurs between refrigerant and cooling water in the first waste heat-recovering heat exchanger 221 due to temperature difference between the refrigerant and the cooling water. In detail, refrigerant introduced into the first waste heat-recovering heat exchanger 221 is condensed in the indoor unit 110, and is then expanded in an expansion valve 126. As a result, the refrigerant is maintained in a low-temperature and low-pressure state. Accordingly, heat is transferred from the high-temperature cooling water to the refrigerant. Thus, the temperature of the refrigerant introduced into the first outdoor heat exchanger 121 during low-temperature heating is increased and, as such, frost formed on the first outdoor heat exchanger 121 may be removed. Furthermore, formation of frost on the first outdoor heat exchanger 121 may be retarded.

Similarly, in the second waste heat-recovering heat exchanger 222, heat is transferred from cooling water to cold refrigerant expanded in an expansion valve 137. Accordingly, the temperature of the refrigerant introduced into the second outdoor heat exchanger 131 is increased and, as such, frost formed on the second outdoor heat exchanger 131 during low-temperature heating may be removed.

Thus, in accordance with the present invention, it may be possible to prevent degradation of the heating performance of the EHP type first outdoor unit 120 by utilizing waste heat of the engine 136 of the GHP type second outdoor unit 130 upon defrosting the first outdoor heat exchanger 121 of the EHP type first outdoor unit 120.

In addition, it may be possible to cope with a wide range of heating loads while achieving high energy efficiency by driving the EHP type first outdoor unit 120 as well as the GHP type second outdoor unit 130. In detail, it may be possible to prevent degradation of energy efficiency caused by operation of the engine 136 by reducing the operation rate of the GHP type second outdoor unit 130. In addition, it may be possible to cope with shortage of the heating capacity of the air conditioner by increasing the operation rate of the EHP type first outdoor unit 120. In the EHP system, it may be possible to cope with a wide range of heating loads while enhancing the overall efficiency because the EHP system exhibits high energy efficiency and may adjust the capacity of the compressor through control of current.

Figure 2:
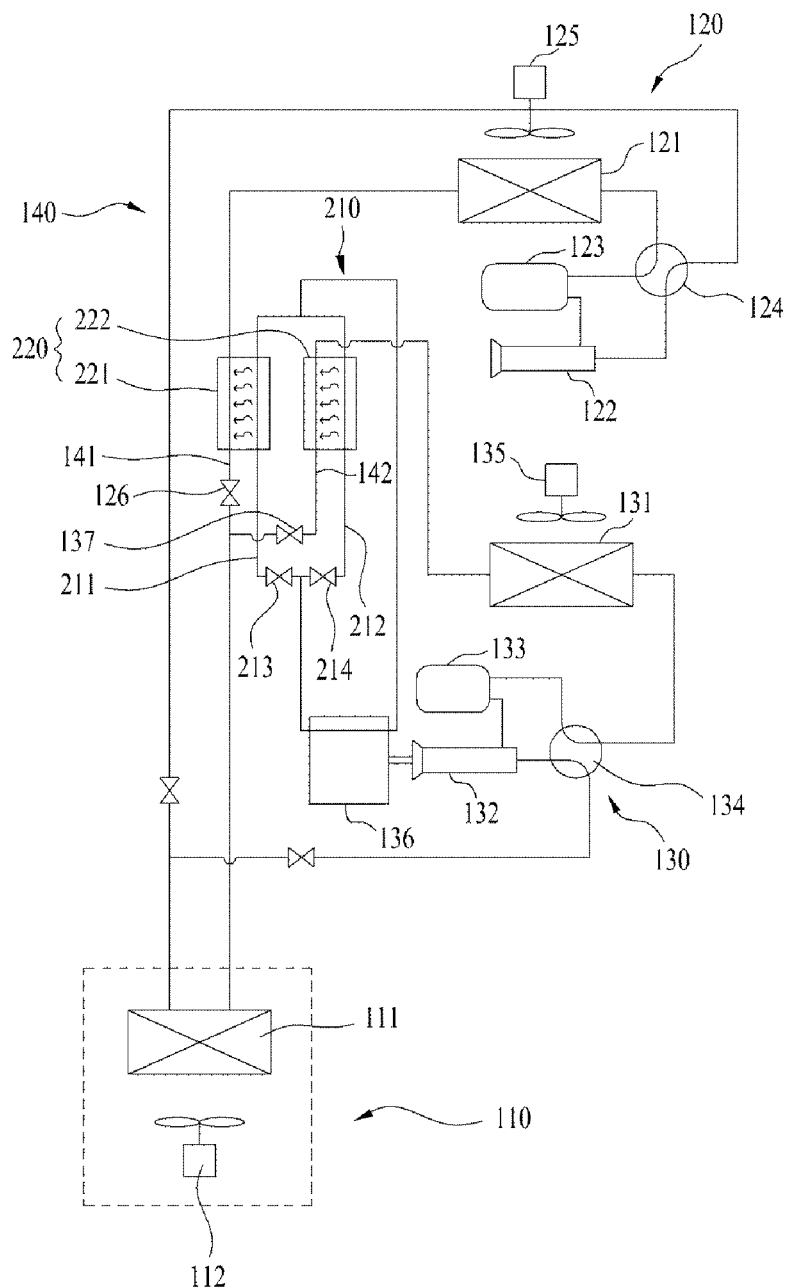
FIG. 2 is a diagram illustrating a configuration of an air conditioner according to an embodiment of the present invention, which includes first and second waste heat-recovering heat exchangers arranged in parallel.

FIG. 2 is a diagram illustrating a configuration of an air conditioner according to an embodiment of the present invention, which includes first and second waste heat-recovering heat exchangers arranged in parallel.

The first and second waste heat-recovering heat exchangers, which are designated by reference numerals 221 and 222, respectively, may be arranged in parallel.

In detail, the first and second waste heat-recovering heat exchangers 221 and 222 may be arranged in parallel in a flow direction of cooling water. Cooling water flowing along a cooling water line 210 may flow through the first and second waste heat-recovering heat exchangers 221 and 222. In this case, the cooling water line 210 may be branched. In detail, the cooling water line 210 may include a first branched line 211 connected to the first waste heat-recovering heat exchanger 221, and a second branched line 212 connected to the second waste heat-recovering heat exchanger 222.

Accordingly, cooling water heated while passing through the engine 136 is divided to be introduced into the first waste heat-recovering heat exchanger 221 along the first branched line 211 or to be introduced into the second waste heat-recovering heat exchanger 222 along the second branched line 212.

In this case, the first branched line 211 may be provided with a first control valve 213, whereas the second branched line 212 may be provided with a second control valve 214. It may be possible to adjust amounts of cooling water performing heat exchange in the first and second waste heat-recovering heat exchangers 221 and 222 by adjusting opening degrees of the first and second control valves 213 and 214, respectively.

Temperature sensors (not shown) may be provided at the first and second waste heat-recovering heat exchangers 221 and 222, respectively. In accordance with the temperatures of the first and second waste heat-recovering heat exchangers 221 and 222 measured by the temperature sensors, the opening degrees of the first and second control valves 213 and 214 may be adjusted. That is, the opening degree of the control valve to adjust the amount of cooling water exchanging heat with the outdoor heat exchanger exhibiting a lower temperature is increased, as compared to the other control valve, in order to increase the temperature of refrigerant to be introduced into the outdoor heat exchanger.

For example, when the temperature of the first outdoor heat exchanger 121 is lower than the temperature of the second outdoor heat exchanger 131, it may be necessary to increase the temperature of refrigerant to be introduced into the first outdoor heat exchanger 121 because there is high possibility of formation of frost on the first outdoor heat exchanger 121. To this end, the opening degree of the first control valve 213 is adjusted to be greater than that of the second control valve 214 in order to increase the amount of cooling water introduced into the first waste heat-recovering heat exchanger 221. Accordingly, the amount of cooling water introduced into the first waste heat-recovering heat exchanger 221 is greater than the amount of cooling water introduced into the second waste heat-recovering heat exchanger 222 and, as such, an increased amount of heat may be transferred to refrigerant passing through the first waste heat-recovering heat exchanger 221.

Alternatively, the opening degrees of the first and second control valves 213 and 214 may be adjusted in order to introduce an increased amount of cooling water into one of the first and second waste heat-recovering heat exchangers 221 and 222, which exhibits a lower refrigerant temperature than that of the other. This is because the outdoor heat exchanger exhibiting a lower refrigerant temperature may exhibit a high possibility of formation of frost.

On the other hand, the waste heat-recovering heat exchanger 220 may be controlled such that cooling water exchanges heat with only the refrigerant to be introduced into the first outdoor heat exchanger 121 or with only the refrigerant to be introduced into the second outdoor heat exchanger 131. That is, it may be possible to introduce cooling water into only one of the first and second waste heat-recovering heat exchangers 221 and 222 by controlling opening or closing of the first and second control valves 213 and 214.

Figure 3:
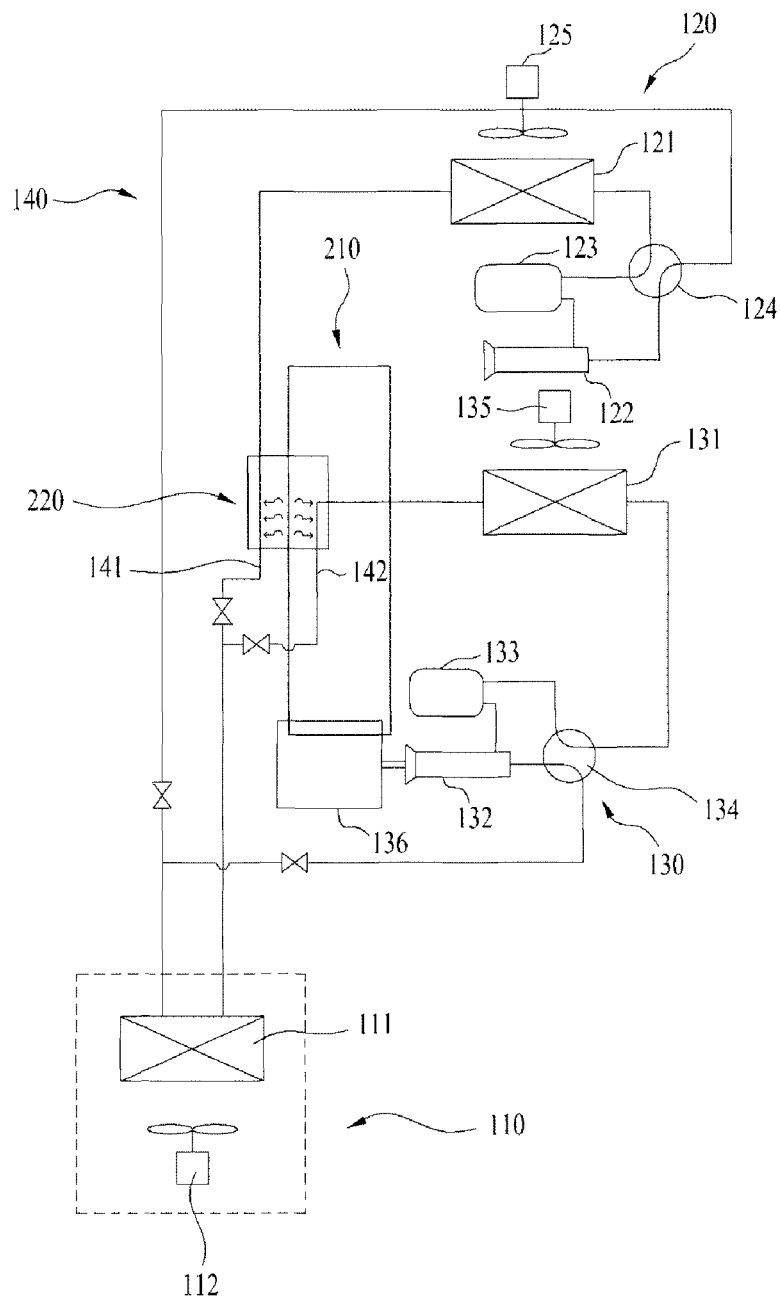
FIG. 3 is a diagram illustrating a configuration of an air conditioner according to an embodiment of the present invention, which includes a single waste heat-recovering heat exchanger.

FIG. 3 is a diagram illustrating a configuration of an air conditioner according to an embodiment of the present invention, which includes a single waste heat-recovering heat exchanger.

The present invention may include a single waste heat-recovering heat exchanger 220. Connected to the waste heat-recovering heat exchanger 220 are a refrigerant line 141, through which refrigerant to be introduced into a first outdoor heat exchanger 121 flows, and a refrigerant line 142, through which refrigerant to be introduced into a second outdoor heat exchanger 131 flows. A cooling water line 210 may also be connected to the waste heat-recovering heat exchanger 220.

In the waste heat-recovering heat exchanger 220, heat may be simultaneously transferred from cooling water to the refrigerant to be introduced into the first outdoor heat exchanger 121 and the refrigerant to be introduced into the second outdoor heat exchanger 131. Accordingly, the configuration of the air conditioner may be simplified because it may be possible to defrost the first outdoor heat exchanger 121 and second outdoor heat exchanger 131, using the single waste heat-recovering heat exchanger 220.

Figure 4:
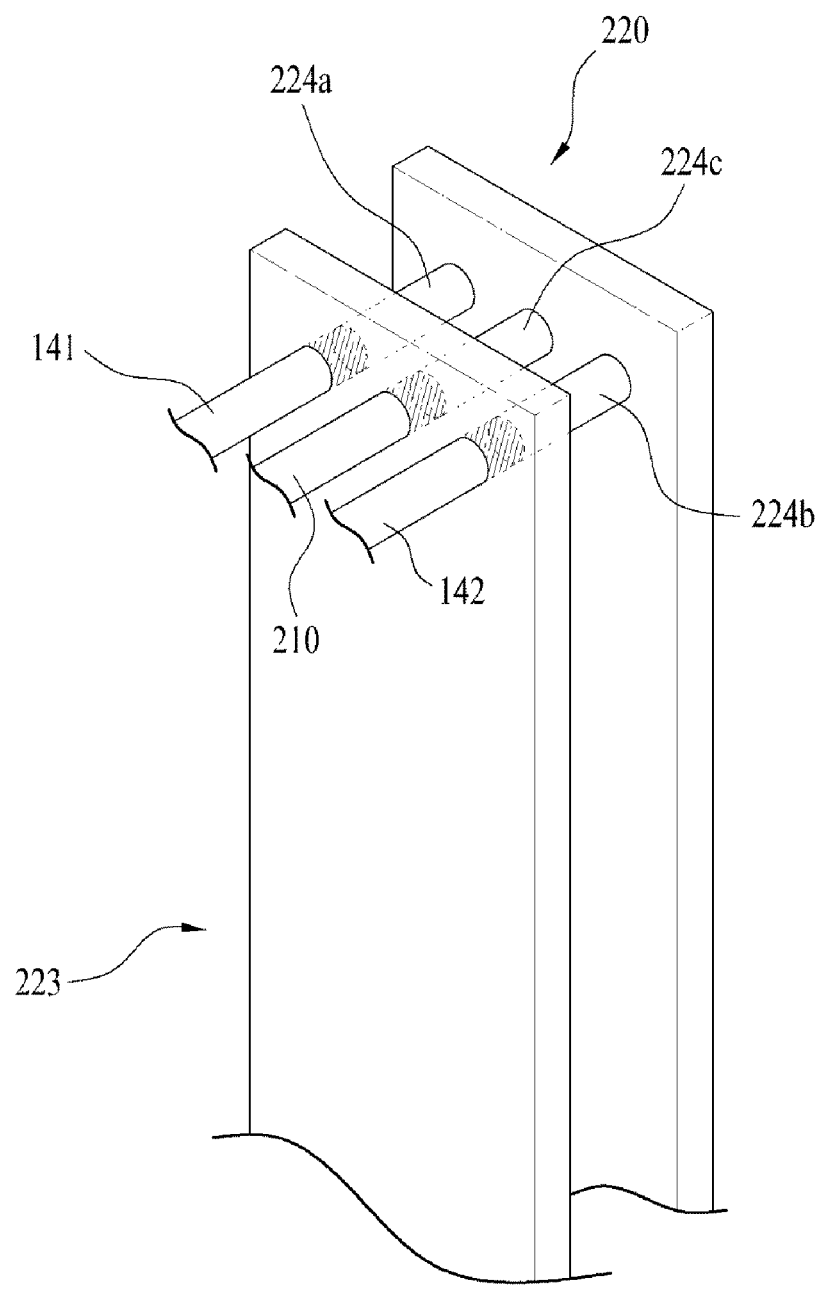
FIG. 4 is a perspective view of a waste heat-recovering heat exchanger according to an embodiment of the present invention.

In this case, as illustrated in FIG. 4, the waste heat-recovering heat exchanger 220 may include a first passage 224a, through which refrigerant to be introduced into the first outdoor heat exchanger 121 flows, a second passage 224b, through which refrigerant to be introduced into the second outdoor heat exchanger 131 flows, and a cooling water passage 224c, through which cooling water flows.

The cooling water passage 224c is preferably arranged between the first passage 224a and the second passage 224b. The spacing between the cooling water passage 224c and the first passage 224a and the spacing between the cooling water passage 224c and the second passage 224b are equal and, as such, heat from cooling water may be equally transferred to the first and second passages 224a and 224b.

The waste heat-recovering heat exchanger 220 has a pin-tube structure. That is, the first passage 224a, second passage 224b, and cooling water passage 224c simultaneously extend through a plurality of fins 223 and, as such, heat exchange may occur among fluids flowing through the lines.

Figure 5:
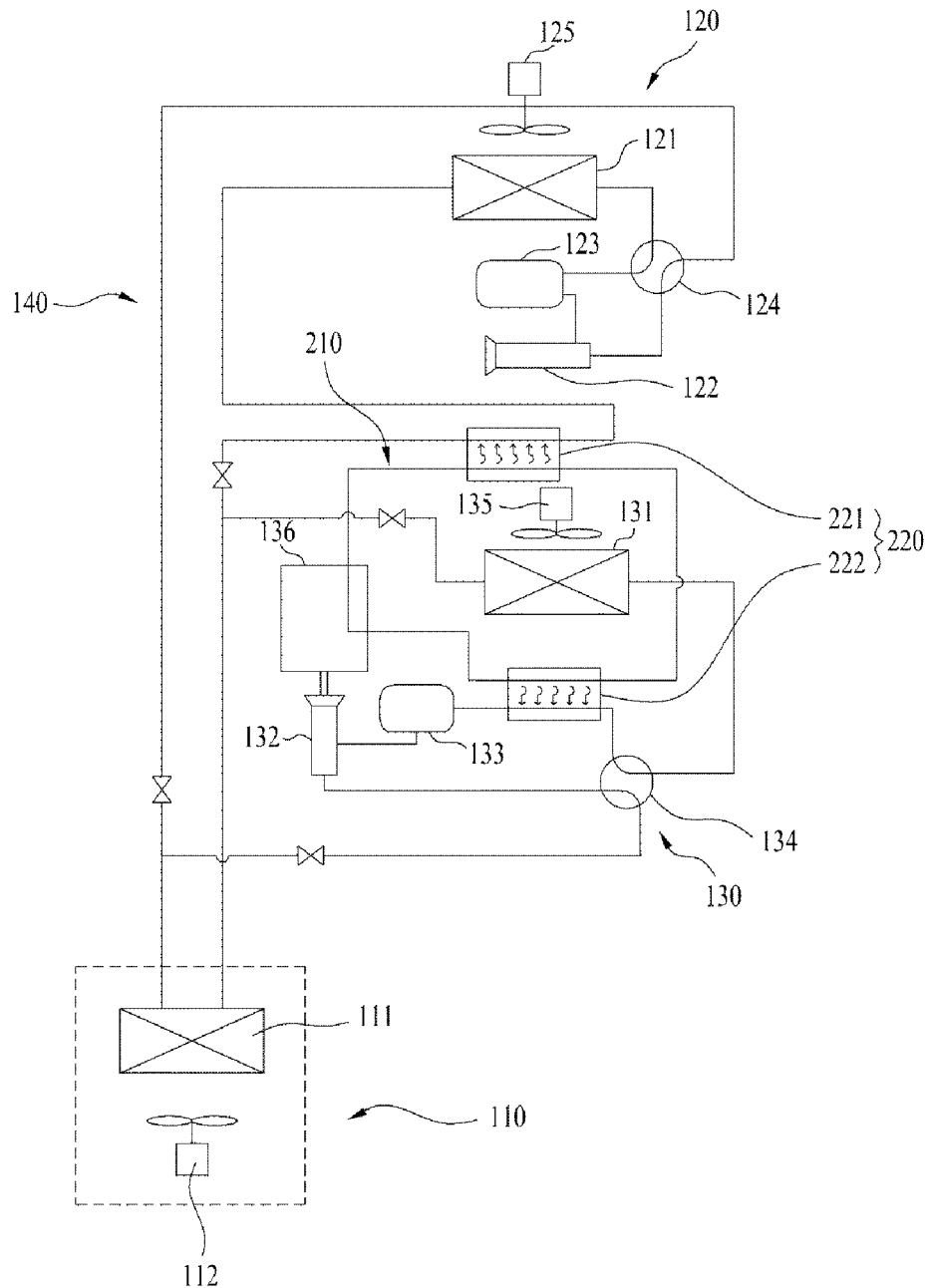
FIG. 5 is a diagram illustrating a configuration of an air conditioner according to an embodiment of the present invention, which includes a waste heat-recovering heat exchanger for heat-exchanging cooling water with refrigerant to be introduced into a compressor.

The present invention is not limited to the above-described structure. For example, as illustrated in FIG. 5, the present invention may include at least one waste heat-recovering heat exchanger 220 for heat-exchanging cooling water flowing through the cooling water line 210 with refrigerant to be introduced into the first outdoor heat exchanger 121 and refrigerant to be introduced into the second compressor 132.

The first waste heat-recovering heat exchanger 221 functions to avoid formation of frost on the first outdoor heat exchanger 121 by increasing the temperature of refrigerant to be introduced into the first outdoor heat exchanger 121. On the other hand, the second waste heat-recovering heat exchanger 222 increases the temperature of refrigerant to be introduced into the second compressor 132, thereby enhancing heating capacity rather than defrosting performance.

That is, it may be preferable to achieve an enhancement in heating performance by increasing the temperature of refrigerant to be introduced into the compressor other than the outdoor heat exchanger, using the waste heat-recovering heat exchanger 220.

Of course, although not shown, it may be possible to employ at least one waste heat-recovering heat exchanger 220 for heat-exchanging cooling water flowing through the cooling water line 210 with refrigerant to be introduced into the first compressor 122 and refrigerant to be introduced into the second outdoor heat exchanger 131.

Meanwhile, the present invention includes a control unit (not shown) for controlling the overall configuration of the air conditioner including the indoor unit 110, first outdoor unit 120, and second outdoor unit 130. The control unit may operate both the first outdoor unit 120 and the second outdoor unit 130 when heating load is equal to or greater than predetermined load. On the other hand, when heating load is smaller than the predetermined load, the control unit operates only the first outdoor unit 120.

That is, the EHP type first outdoor unit 120 may easily adjust the capacity of the first compressor 122 through control of current and, as such, is suitable for partial load. Accordingly, when heating load is smaller than the predetermined load, the control unit operates only the first outdoor unit 120. On the other hand, when heating load is equal to or greater than the predetermined load, the control unit 130 additionally operates the second outdoor unit 130, to supplement heating capacity. In this case, it may be possible to avoid degradation of heating efficiency because the first outdoor unit 120 operates continuously.

In this case, when heating load is smaller than the predetermined load, and the electricity price per energy unit is higher than the fuel price per energy unit by a predetermined value or more, the control unit stops operation of the first outdoor unit 120, and operates the second outdoor unit 130.

The control unit may receive electricity information from a power supply source such as a power plant on a real time basis. When it is advantageous in terms of cost to operate the GHP type second outdoor unit 130 in spite of low efficiency thereof because the electricity price per energy unit is higher than the fuel price per energy unit by a predetermined value or more, the second outdoor unit 130 is operated in place of the first outdoor unit 120.

Figure 6:
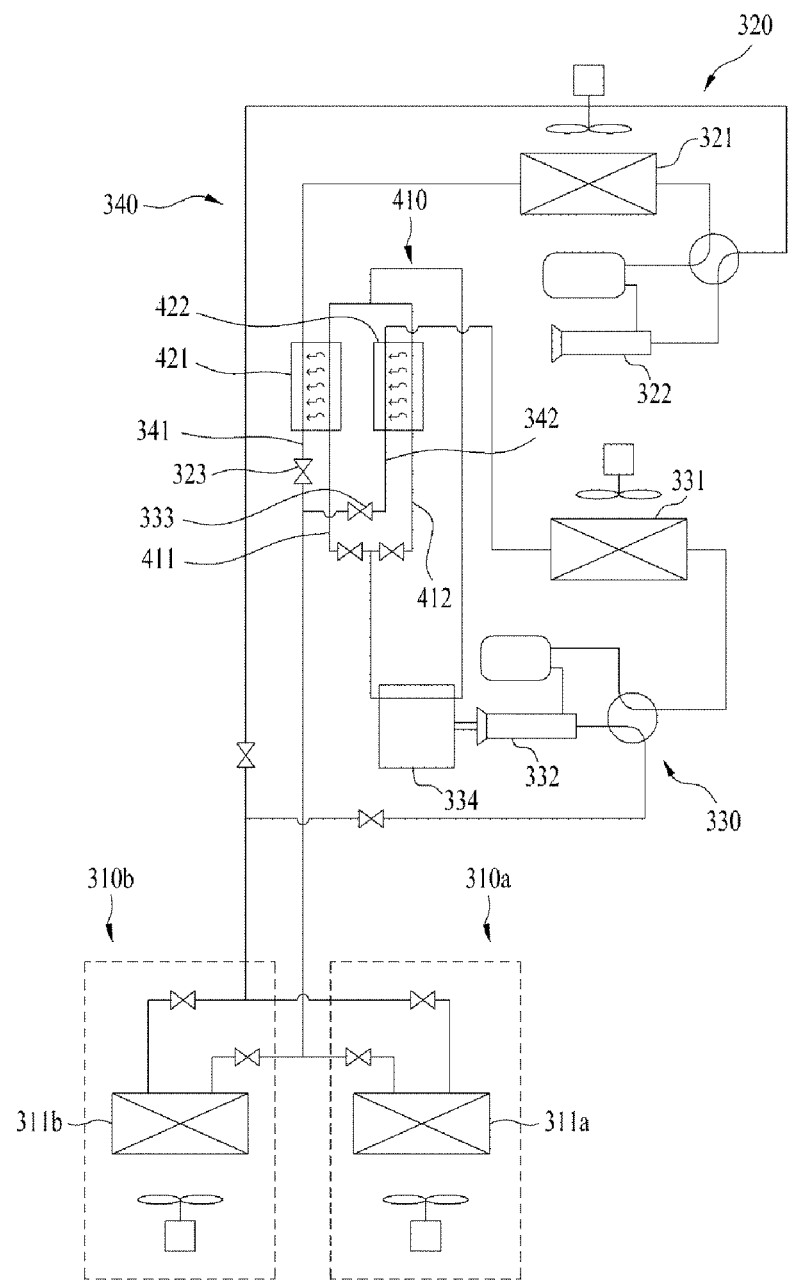
FIG. 6 is a diagram illustrating a configuration of an air conditioner according to another embodiment of the present invention, which includes first and second waste heat-recovering heat exchangers arranged in parallel.
Figure 7:
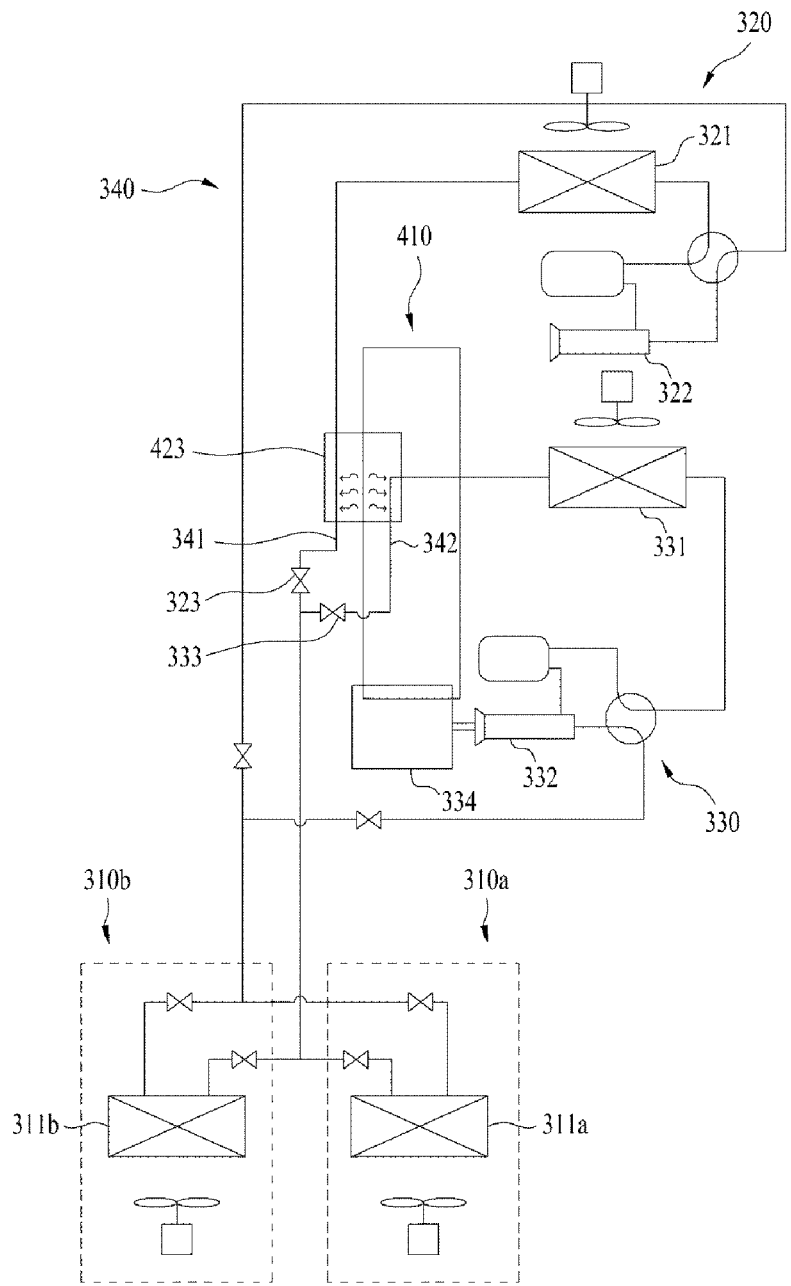
FIG. 7 is a diagram illustrating a configuration of an air conditioner according to another embodiment of the present invention, which includes a single waste heat-recovering heat exchanger.

FIGS. 6 and 7 are diagrams each illustrating an air conditioner according to another embodiment of the present invention. Descriptions overlapping with the above description will be omitted or briefly described.

In accordance with another embodiment, the present invention may include a plurality of indoor units 310a and 310b, at least one EHP type outdoor unit 320 including a first outdoor heat exchanger 321 and a first compressor 322 to be driven by electricity, and at least one GHP type outdoor unit 330 including a second outdoor heat exchanger 331, a second compressor 322 to be driven by an engine 334, and a cooling water line 410 to cool the second compressor 322.

The at least one EHP type outdoor unit 320 and at least one GHP type outdoor unit 330 according to the present invention may be connected in common to the indoor units 310a and 310b via a refrigerant line 340.

Of course, the present invention is not limited to such an arrangement. For example, the EHP type outdoor unit 320 and GHP type outdoor unit 330 may be independent configurations of the air conditioner, to be connected to the indoor units 310 and 310b in an independent manner. Even when the EHP type outdoor unit 320 and GHP type outdoor unit 330 may be independent configurations of the air conditioner, they may be collectively controlled by the same control unit (not shown).

Meanwhile, the present invention includes heat transfer means for transferring waste heat of cooling water flowing through the cooling water line 410 to refrigerant to be introduced into the first outdoor heat exchanger 321 and refrigerant to be introduced into the second outdoor heat exchanger 331.

As illustrated in FIG. 6, the heat transfer means may include a first waste heat-recovering heat exchanger 421, to which the cooling water line 410 is connected along with a refrigerant line 341, through which refrigerant to be introduced into the first outdoor heat exchanger 321 flows, and a second waste heat-recovering heat exchanger 422, to which the cooling water line 410 is connected along with a refrigerant line 342, through which refrigerant to be introduced into the second outdoor heat exchanger 331 flows.

In each of the first and second waste heat-recovering heat exchangers 421 and 422, heat exchange occurs between refrigerant and cooling water due to a temperature difference between the refrigerant and the cooling water. Refrigerant introduced into the first and second outdoor heat exchangers 321 and 331 is condensed in the indoor units 310a and 310b, and is expanded by expansion valves 323 and 333, to be maintained in a low-temperature and low-pressure state. As a result, heat is transferred from hot cooling water to the refrigerant. Accordingly, the temperature of the refrigerant introduced into the first and second outdoor heat exchangers 321 and 331 during low-temperature heating is increased and, as such, it may be possible to remove frost formed on the first and second outdoor heat exchangers 321 and 331.

In accordance with the present invention, waste heat of the engine 334 of the GHP type outdoor unit 330 is utilized to defrost the first outdoor heat exchanger 321 of the EHP type outdoor unit 320. Accordingly, it may be possible to prevent degradation of the heating performance of the EHP type outdoor unit. In addition, it may be possible to cope with a wide range of heating loads while achieving high energy efficiency by driving the EHP type outdoor unit 320 as well as the GHP type outdoor unit 330.

In this case, the first and second waste heat-recovering heat exchangers 421 and 422 are arranged in parallel. The cooling water line 410 is branched into a plurality of branched lines 411 and 412 corresponding in number to the first and second waste heat-recovering heat exchangers 421 and 422, and, as such, the branched lines 411 and 412 are connected to the first and second waste heat-recovering heat exchangers 421 and 422, respectively.

It may be possible to adjust degrees of heat exchange in the first and second waste heat-recovering heat exchangers 421 and 422 by adjusting amounts of cooling water introduced into the branched lines 411 and 412 in accordance with temperatures of refrigerant to be introduced into the first and second outdoor heat exchangers 321 and 331. Since the outdoor heat exchanger exhibiting a lower refrigerant temperature exhibits a higher possibility of formation of frost, the amount of cooling water introduced into the waste heat-recovering heat exchanger corresponding to the outdoor heat exchanger is adjusted to be greater than the amount of cooling water introduced into the remaining waste heat-recovering heat exchanger.

As illustrated in FIG. 7, the heat transfer means may include a waste heat-recovering heat exchanger 423, to which the cooling water line 410 is connected along with a portion of the refrigerant line 340, through which refrigerant to be introduced into the first outdoor heat exchanger 321 flows, and a portion of the refrigerant line 340, through which refrigerant to be introduced into the second outdoor heat exchanger 331 flows.

In the waste heat-recovering heat exchanger 423, heat is transferred from the cooling water to the refrigerant to be introduced into the first outdoor heat exchanger 321 and the refrigerant to be introduced into the second outdoor heat exchanger 331. Accordingly, it may be possible to defrost the first and second heat exchangers 321 and 331, using the single waste heat-recovering heat exchanger 423 and, as such, the structure of the air conditioner may be simplified.

Meanwhile, the waste heat-recovering heat exchanger 423 may include a first passage, through which refrigerant to be introduced into the first outdoor heat exchanger 321 flows, a second passage, through which refrigerant to be introduced into the second outdoor heat exchanger 331 flows, and a cooling water passage, through which cooling water flows.

In this case, the cooling water passage may be arranged between the first passage and the second passage. The spacing between the cooling water passage and the first passage and the spacing between the cooling water passage and the second passage are equal and, as such, heat from cooling water may be equally transferred to the first and second passages.

Of course, the present invention is not limited to the above-described arrangement. The heat transfer means may transfer waste heat of the engine 334 to the refrigerant of the EHP type outdoor unit 320, using a separate heat transfer fluid line. Alternatively, the engine 334 may be arranged in the vicinity of the EHP type outdoor unit 320 under the condition in which a heat transfer member is interposed between the engine 334 and the EHP type outdoor unit 320 and, as such, waste heat may be transferred.

In an embodiment of the present invention, the air conditioner includes an indoor unit 110 including an indoor heat exchanger, a first outdoor unit 120 connected to the indoor heat exchanger via a refrigerant line while including a first outdoor heat exchanger and a first compressor to be driven by electricity, a second outdoor unit 130 connected to the indoor heat exchanger via another refrigerant line while including a second outdoor heat exchanger and a second compressor to be driven by an engine, a cooling water line 210, through which cooling water to cool the engine flows, and a waste heat-recovering heat exchanger 221 arranged at the cooling water line 210, to exchange heat between refrigerant to be introduced into the first outdoor heat exchanger 121 and the cooling water.

The waste heat-recovering heat exchanger 220 may include only the first waste heat-recovering heat exchanger 221.

MODE FOR THE INVENTION

Various embodiments have been described in the best mode for carrying out the invention.

INDUSTRIAL APPLICABILITY

In accordance with the present invention, it may be possible to provide an air conditioner, which includes an electric heat pump (EHP) type outdoor unit and a gas engine-driven heat pump (GHP) type outdoor unit, thereby being capable of achieving an enhancement in heating efficiency while achieving an enhancement in defrost performance during low-temperature heating.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An air conditioner comprising:
    an indoor unit comprising an indoor heat exchanger;
    a first outdoor unit connected to the indoor heat exchanger via a refrigerant line, the first outdoor unit comprising a first outdoor heat exchanger and a first compressor to be driven by electricity;
    a second outdoor unit connected to the indoor heat exchanger via another refrigerant line, the second outdoor unit comprising a second outdoor heat exchanger and a second compressor to be driven by an engine;
    a cooling water line, through which cooling water to cool the engine flows; and
    at least one waste heat-recovering heat exchanger for exchanging heat between refrigerant to be introduced into at least one of the first outdoor heat exchanger and the second outdoor heat exchanger and the cooling water flowing through the cooling water line,
    wherein the waste heat-recovering heat exchanger comprises a first waste heat-recovering heat exchanger for exchanging heat with the refrigerant to be introduced into the first outdoor heat exchanger, and a second waste heat-recovering heat exchanger for exchanging heat with the refrigerant to be introduced into the second outdoor heat exchanger.

2. The air conditioner according to claim 1, wherein the waste heat-recovering heat exchanger heat-exchanges the refrigerant to be introduced into the first outdoor heat exchanger and the cooling water.

3. The air conditioner according to claim 1, wherein the waste heat-recovering heat exchanger heat-exchanges the refrigerant to be introduced into the second outdoor heat exchanger and the cooling water.

4. The air conditioner according to claim 1, wherein the cooling water sequentially passes through the first waste heat-recovering heat exchanger and the second waste heat-recovering heat exchanger after being heated while cooling the engine, to exchange heat with the refrigerant.

5. The air conditioner according to claim 1, wherein:
    the first waste heat-recovering heat exchanger and the second waste heat-recovering heat exchanger are arranged in parallel in a flow direction of the cooling water; and
    the cooling water line is branched into a first branched line connected to the first waste heat-recovering heat exchanger and a second branched line connected to the second waste heat-recovering outdoor heat exchanger.

6. The air conditioner according to claim 5, further comprising:
    a first control valve provided at the first branched line, to adjust an amount of the cooling water performing heat exchange in the first waste heat-recovering heat exchanger; and
    a second control valve provided at the second branched line, to adjust an amount of the cooling water performing heat exchange in the second waste heat-recovering heat exchanger.

7. The air conditioner according to claim 6, wherein opening degrees of the first and second control valves are adjusted to differ from each other such that a greater amount of cooling water is introduced into one of the first and second waste heat-recovering heat exchangers, which exhibits a lower refrigerant temperature.

8. The air conditioner according to claim 1, wherein the waste heat-recovering heat exchanger is connected with the refrigerant line, through which the refrigerant to be introduced into the first outdoor heat exchanger flows, the refrigerant line, through which the refrigerant to be introduced into the second outdoor heat exchanger flows, and the cooling water line.

9. The air conditioner according to claim 8, wherein:
    the waste heat-recovering heat exchanger comprises a first passage, through which the refrigerant to be introduced into the first outdoor heat exchanger flows, a second passage, through which the refrigerant to be introduced into the second outdoor heat exchanger flows, and a cooling water passage, through which cooling water flows; and
    the cooling water passage is arranged between the first passage and the second passage.

10. The air conditioner according to claim 1, wherein:
    both the first outdoor unit and the second outdoor unit operate when heating load is equal to or greater than predetermined load; and
    only the first outdoor unit operates when heating load is smaller than the predetermined load.

11. The air conditioner according to claim 10, wherein, when heating load is smaller than the predetermined load, and an electricity price per energy unit is higher than a fuel price per energy unit by a predetermined value or more, operation of the first outdoor unit is stopped, and the second outdoor unit operates.

12. An air conditioner comprising a plurality of indoor units, at least one electric heat pump (EHP) type outdoor unit comprising a first outdoor heat exchanger and a first compressor to be driven by electricity, and at least one a gas engine-driven heat pump (GHP) type outdoor unit comprising a second outdoor heat exchanger, a second compressor to be driven by an engine, and a cooling water line to cool the second compressor, further comprising:
    a heat transfer unit for transferring waste heat of cooling water flowing through the cooling water line to refrigerant to be introduced into the first outdoor heat exchanger and refrigerant to be introduced into the second outdoor heat exchanger,
    wherein the heat transfer unit comprises a first waste heat-recovering heat exchanger, to which the cooling water line is connected along with a refrigerant line, through which the refrigerant to be introduced into the first outdoor heat exchanger flows, and a second waste heat-recovering heat exchanger, to which the cooling water line is connected along with a refrigerant line, through which the refrigerant to be introduced into the second outdoor heat exchanger flows.

13. The air conditioner according to claim 12, wherein:
the first and second waste heat-recovering heat exchangers are arranged in parallel; and
the cooling water line is branched into a plurality of branched lines corresponding in number to the first and second waste heat-recovering heat exchangers such that the branched lines are connected to the first and second waste heat-recovering heat exchangers, respectively.

14. The air conditioner according to claim 12, wherein the heat transfer unit comprises a waste heat-recovering heat exchanger, to which the cooling water line is connected along with a refrigerant line, through which the refrigerant to be introduced into the first outdoor heat exchanger flows, and another refrigerant line, through which the refrigerant to be introduced into the second outdoor heat exchanger flows.

15. The air conditioner according to claim 14, wherein:
the waste heat-recovering heat exchanger comprises a first passage, through which the refrigerant to be introduced into the first outdoor heat exchanger flows, a second passage, through which the refrigerant to be introduced into the second outdoor heat exchanger flows, and a cooling water passage, through which cooling water flows; and
the cooling water passage is arranged between the first passage and the second passage.

* * * * *